(12) United States Patent
Araki et al.

(10) Patent No.: US 6,573,356 B2
(45) Date of Patent: Jun. 3, 2003

(54) ROOM TEMPERATURE-CURING ORGANOPOLYSILOXANE COMPOSITION

(75) Inventors: Tadashi Araki, Annaka (JP); Norio Kameda, Annaka (JP); Tsuneo Kimura, Annaka (JP)

(73) Assignee: Shin-Etsu Chemical Co. Ltd., Tokyo (JP)

( * ) Notice: Subject to any disclaimer, the term of this patent is extended or adjusted under 35 U.S.C. 154(b) by 0 days.

(21) Appl. No.: 09/955,079

(22) Filed: Sep. 19, 2001

(65) Prior Publication Data

US 2002/0065385 A1 May 30, 2002

(30) Foreign Application Priority Data

Sep. 20, 2000 (JP) ........................................ 2000-285994

(51) Int. Cl.⁷ ........................... C08G 77/26; C08G 77/23
(52) U.S. Cl. ............................. 528/34; 528/30; 528/38; 528/41
(58) Field of Search ............................. 528/34, 38, 41, 528/30

(56) References Cited

U.S. PATENT DOCUMENTS

| | | | |
|---|---|---|---|
| 4,568,718 A | * 2/1986 | Huebner et al. | 523/312 |
| 4,710,405 A | * 12/1987 | Graiver et al. | 427/387 |
| 4,772,515 A | 9/1988 | Hara et al. | |
| 4,973,644 A | * 11/1990 | Onishi et al. | 528/15 |
| 5,969,075 A | * 10/1999 | Inoue | 528/15 |

FOREIGN PATENT DOCUMENTS

| | | |
|---|---|---|
| EP | 0 738 768 | 10/1996 |
| EP | 0 816 436 | 1/1998 |
| EP | 1 031 611 | 8/2000 |

* cited by examiner

*Primary Examiner*—Robert Dawson
*Assistant Examiner*—Marc S. Zimmer
(74) *Attorney, Agent, or Firm*—Oblon, Spivak, McClelland, Maier & Neustadt, P.C.

(57) ABSTRACT

A room temperature-curing organopolysiloxane composition including (A) 100 parts by weight of at least one of two specific organopolysiloxanes; (B) 0.1 to 30 parts by weight of a silane compound having in its molecule an average of at least two Si-bonded hydrolyzable groups and in which the remaining Si-bonded group(s) is/are a group(s) selected from the group consisting of methyl, ethyl, propyl, vinyl and phenyl groups; a partial hydrolysis-condensation product thereof; or a mixture of these; and (C) 0.1 to 10 parts by weight of a mixture of siloxanes having degrees of polymerization of 2 to 10. The mixture of siloxanes is a partial hydrolysis-condensation product of a silane compound having a group selected from amino, epoxy, mercapto, acryloyl and methacryloyl groups each bonded to the silicon atom through a carbon atom and having a Si-bonded hydrolyzable group. The composition has superior adhesion to various resins.

5 Claims, No Drawings

ROOM TEMPERATURE-CURING ORGANOPOLYSILOXANE COMPOSITION

BACKGROUND OF THE INVENTION

1. Field of the Invention

This invention relates to a room temperature-curing organopolysiloxane composition having superior adhesion to resins, used for building construction or used in the bonding or fixing of electric or electronic component parts.

2. Description of the Prior Art

RTV (room temperature vulcanizable) silicone rubbers cross-linkable by moisture are easy to handle and also have superior weatherability and electrical properties. Accordingly, they are utilized in various fields such as sealing materials for building construction and adhesives used in electric and electronic fields. Especially in the sealing materials for building construction, deoxime-type RTV silicone rubbers having superior weatherability are in wide use. In respect of adherends such as resin materials, however, there is a tendency toward the use of dealcohol-type ones on account of suitability for resins. The same also applies to the bonding or fixing of electric or electronic component parts.

However, with development of various adhesive compositions and improvement in techniques for ensuring durability of resins, cases have increased in which conventional sealing materials can not bond some adherends.

SUMMARY OF THE INVENTION

Accordingly, an object of the present invention is to provide a room temperature-curing organopolysiloxane composition having superior adhesion to resins of various types.

Taking account of the above background, the present inventors have tried making development of sealing materials which are adhesive to resins. As a result, they have discovered that the use of a partial hydrolysis-condensation product of a specific silane compound brings about a dramatic improvement in adhesion to resins having ever been considered to be slightly bondable. Thus, they have accomplished the present invention.

More specifically, the present invention provides a room temperature-curing organopolysiloxane composition comprising:

(A) 100 parts by weight of at least one member selected from the group consisting of an organopolysiloxane represented by the general formula (1):

$$HO(SiR^1_2O)_nH \tag{1}$$

wherein $R^1$'s are each independently a substituted or unsubstituted monovalent hydrocarbon group having 1 to 10 carbon atoms, and n is an integer of 10 or more; and an organopolysiloxane represented by the general formula (2):

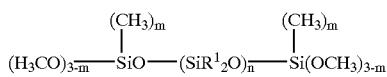

wherein $R^1$'s and n are as defined above, and m's are each independently an integer of 0 or 1;

(B) from 0.1 part by weight to 30 parts by weight of a silane compound having in one molecule an average of at least two silicon atom-bonded hydrolyzable groups and in which the silicon atom-bonded remaining group or groups is/are a group or groups selected from the group consisting of a methyl group, an ethyl group, a propyl group, a vinyl group and a phenyl group; a partial hydrolysis-condensation product thereof; or a mixture of these; and (C) from 0.1 part by weight to 10 parts by weight of a mixture of siloxanes having degrees of polymerization of from 2 to 10, which is a partial hydrolysis-condensation product of a silane compound having a group selected from the group consisting of an amino group, an epoxy group, a mercapto group, an acryloyl group and a methacryloyl group each bonded to the silicon atom through a carbon atom and having a hydrolyzable group bonded to the silicon atom.

DESCRIPTION OF THE PREFERRED EMBODIMENTS

The present invention is described below in detail.

The organopolysiloxane composition of the present invention is constituted basically of the following components (A) to (C).

Component (A)

The component-(A) is at least one organopolysiloxane selected from the group consisting of an organopolysiloxane represented by the general formula (1):

$$HO(SiR^1_2O)_nH \tag{1}$$

and an organopolysiloxane represented by the general formula (2):

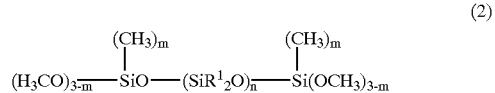

In the general formula (1) or (2) representing the component-(A) organopolysiloxane, $R^1$'s are each independently a substituted or unsubstituted monovalent hydrocarbon group having 1 to 10 carbon atoms, as exemplified by alkyl groups such as a methyl group, an ethyl group and a propyl group; cycloalkyl groups such as a cyclohexyl group; alkenyl groups such as a vinyl group and an allyl group; aryl groups such as a phenyl group and a tolyl group; and corresponding substituted groups in which the hydrogen atoms have partially been substituted with a halogen atom or the like, e.g., 3,3,3-trifluoropropyl group. In the general formula (1) or (2), $R^1$'s may be identical with or different from each other. Letter symbol n in the general formula (1) and (2) is an integer of 10 or more, and may particularly be an integer that makes this diorganopolysiloxane have a viscosity at 25° C. within the range of from 25 to 500,000 cSt, and preferably within the range of from 500 to 100,000 cSt. Letter symbol m in the general formula (2) is an integer of 0 or 1.

Component (B)

The component-(B) is a silane compound having in one molecule an average of at least two silicon atom-bonded hydrolyzable groups and in which the silicon atom-bonded remaining group or groups, if any, is/are a group or groups selected from the group consisting of a methyl group, an ethyl group, a propyl group, a vinyl group and a phenyl group; a partial hydrolysis-condensation product thereof; or a mixture of these.

The hydrolyzable group the component-(B) silane compound and its partial hydrolysis-condensation product has may include, e.g., a ketoxime group, an alkoxyl group, an acetoxyl group and an isopropenoxyl group.

As specific examples of the component (B), it may include ketoxime silanes such as tetrakis (methylethylketoxime)silane, methyltris(dimethylketoxime) silane, methyltris(methylethylketoxime)silane, ethyltris (methylethylketoxime)silane, methyltris(methylisobutylketoxime)silane and vinyltris(methylethylketoxime) silane; alkoxysilanes such as methyltrimethoxysilane, dimethyldimethoxysilane and vinyltrimethoxysilane; acetoxysilanes such as methyltriacetoxysilane and vinyltriacetoxysilane; and isopropenoxysilanes such as methyltriisopropenoxysilane; as well as partial hydrolysis-condensation products of any of these silanes.

The component (B) is used in an amount ranging from 0.1 to 30 parts by weight, and preferably ranging from 1 to 15 parts by weight, based on 100 parts by weight of the component (A). If it is less than 0.1 part by weight, no sufficient cross-linking may take place to make it difficult to obtain cured products having the intended rubber elasticity. If it is more than 30 parts by weight, the cured products obtained tend to have low mechanical properties.

Component-(C)

The component-(C) siloxane is a component having an important action to improve the adhesion of the composition of the present invention to resins.

The component-(C) siloxane is a partial hydrolysis-condensation product of a specific silane compound, and is a mixture of siloxanes having a hydrolyzable group bonded to a silicon atom and having degrees of polymerization of from 2 to 10.

The silane compound, a precursor substance of the component-(C) siloxane, has a functional group selected from the group consisting of an amino group, an epoxy group, a mercapto group, an acryloyl group and a methacryloyl group, and also any of these functional groups is bonded to the silicon atom through a carbon atom. Where two or more functional groups are present in the silane compound, they may be bonded to the silicon atom through different carbon atoms, or may be bonded to the silicon atom through the same carbon atom.

This silane compound may have 1 to 3, and preferably 2 or 3, hydrolyzable groups. The hydrolyzable group is exemplified by the same examples as those for the hydrolyzable group of the component (B). In particular, an alkoxyl group is preferred.

Of the silane compound, an amino-group-containing silane is preferred. In particular, silanes represented by the general formulas (3) and (4) are preferred.

$$H_2N(CH_2)_nSi(R^3)_c(OR^2)_{3-c} \tag{3}$$

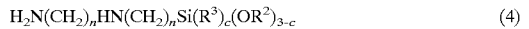

$$H_2N(CH_2)_nHN(CH_2)_nSi(R^3)_c(OR^2)_{3-c} \tag{4}$$

In the general formulas (3) and (4), $R^3$ and $R^4$ are each an alkyl group having 1 to 4, and preferably 1 or 2, carbon atoms such as a methyl group, an ethyl group, a propyl group or a butyl group; and n is an integer of 1 to 10, and c is an integer of 0 to 2, and preferably 0 or 1.

As specific examples of the above silane compound, it may include amino silanes such as 3-aminopropyldimethoxymethylsilane, 3-aminopropyltrimethoxysilane, 3-(2-aminoethylamino)propyldimethoxymethylsilane, 3-(2-aminoethylamino)propyltrimethoxysilane, 2-aminoethylaminomethyldimethoxymethylsilane and 2-aminoethylaminomethyltrimethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as 3-glycidoxypropyltrimethoxysilane, 3-glycidoxypropyldimethoxymethylsilane, 3-glycidoxyethyltrimethoxysilane and 3-glycidoxyethyldimethoxymethylsilane; and (meth) acryloyl-containingsilanes, where "(meth)acryloyl" is a generic term of acryloyl and methacryloyl, such as methacryloxypropyltrimethoxysilane, methacryloxypropyltriethoxysilane, methacryloxypropylmethyldimethoxysilane, acryloxypropyltrimethoxysilane and acryloxypropyltriethoxysilane.

The partial hydrolysis-condensation product of the silane compound, used as the component-(C) is a mixture of siloxanes having degrees of polymerization of from 2 to 10. It may preferably be a mixture of 50% or more, and particularly 70% or more, of di- to tetramers (2- to 4-mers) in total and 20% or less, and particularly 10% or less, of hexa- to decamers (6- to 10-mers) in total.

The component (C) is used in an amount of from 0.1 to 10 parts by weight, and preferably from 2 to 6 parts by weight, based on 100 parts by weight of the component (A).

Other Components

In the present invention, a filler, an additive, a catalyst and so forth which are commonly known may also be used in addition to the components described above. The filler may include ground silica, fumed silica, calcium carbonate, zinc carbonate and wet-process silica. The additive may include polyether as a thixotropy improver, and an antifungal agent and an antibacterial agent may also optionally be added. The catalyst may include organotin compounds, alkoxytitanium, and titanium chelate compounds.

EXAMPLES

The present invention is described below in greater detail by giving Examples.

Synthesis Example 1

Synthesis of Component (C)

The inside of a three-necked round flask having a thermometer, a magnetic stirrer, a reflux condenser, a dropping funnel and a nitrogen feed pipe was displaced with nitrogen.

Subsequently, 1 mole of 3-(2-aminoethylamino) propyltrimethoxysilane was put into the flask, followed by heating to 80° C. Thereafter, 0.2 mole of an aqueous 0.1% hydrochloric acid solution was dropwise added thereto to carry out reaction. In the course of the reaction, its progress was followed up by gel permeation chromatography (GPC) to make sure of decrease in peak area of the 3-(2-aminoethylamino)propyltrimethoxysilane, followed by maturing with heating for 5 hours. Thereafter, the materials were removed under the conditions of 150° C., 10 mmHg and 6 hours to obtain a partial hydrolysis-condensation product 1.

The degrees of polymerization of siloxanes constituting the partial hydrolysis-condensation product 1 were ascertained by GPC and liquid chromatography. The proportion of the siloxanes constituting this partial hydrolysis-condensation product was as follows: dimer: 35%by weight; trimer: 30 by weight; tetramer: 20% by weight; pentamer: 8%by weight; and hexa- to decamers (6- to 10-mers): 7% by weight.

Synthesis Example 2

Synthesis of Component (C)

The inside of a three-necked round flask having a thermometer, a magnetic stirrer, a reflux condenser, a dropping funnel and a nitrogen feed pipe was displaced with nitrogen.

Subsequently, 1 mole of 3-aminopropyltrimethoxysilane was put into the flask, followed by heating to 80° C. Thereafter, 0.2 mole of an aqueous 0.1% hydrochloric acid solution was dropwise added thereto to carry out reaction. In the course of the reaction, its progress was followed up by gel permeation chromatography (GPC) to make sure of decrease in peak area of the 3-aminopropyltrimethoxysilane, followed by maturing with heating for 5 hours. Thereafter, the materials were removed under the conditions of 150° C., 10 mmHg and 6 hours to obtain a partial hydrolysis-condensation product 2.

The degrees of polymerization of siloxanes constituting the partial hydrolysis-condensation product 2 were ascertained by GPC and liquid chromatography. The proportion of the siloxanes constituting this partial hydrolysis-condensation product was as follows: dimer: 37% by weight; trimer: 28% by weight; tetramer: 21% by weight; pentamer: 9% by weight; and hexa- to decamers (6- to 10-mers): 5% by weight.

Example 1

To 90 parts by weight of polydimethylsiloxane having a viscosity at 25° C. of 900 cSt and terminated with trimethoxylsilyl groups, 10 parts by weight of fumed silica surface-treated with dimethyldichlorosilane was added, and these were mixed by means of a mixer. Thereafter, 2 parts by weight of methyltrimethoxysilane and 0.1 part by weight of dibutyltin dioctate were added, followed by thorough mixing under reduced pressure. Then, 2.0 parts by weight of the partial hydrolysis-condensation product 1, synthesized in Synthesis Example 1, was further added, followed by thorough mixing under reduced pressure to obtain a composition.

Example 2

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of methyltributanoximesilane and 0.1 part by weight of dibutyltin dioctate were added, followed by thorough mixing under reduced pressure. Then, 2.0 parts by weight of the partial hydrolysis-condensation product 1, synthesized in Synthesis Example 1, was further added, followed by thorough mixing under reduced pressure to obtain a composition.

Example 3

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of vinyltriisopropenoxysilane, 0.5 part by weight of tetramethylguanidylpropyltrimethoxysilane and 0.1 part by weight of dibutyltin dioctate were added, followed by thorough mixing under reduced pressure. Then, 2.0 parts by weight of the partial hydrolysis-condensation product 1, synthesized in Synthesis Example 1, was further added, followed by thorough mixing under reduced pressure to obtain a composition.

Example 4

To 90 parts by weight of polydimethylsiloxane having a viscosity at 25° C. of 900 cSt and terminated with trimethoxylsilyl groups, 10 parts by weight of fumed silica surface-treated with dimethyldichlorosilane was added, and these were mixed by means of a mixer. Thereafter, 2 parts by weight of methyltrimethoxysilane and 0.1 part by weight of dibutyltin dioctate were added, followed by thorough mixing under reduced pressure. Then, 2.0 parts by weight of the partial hydrolysis-condensation product 2, synthesized in Synthesis Example 2, was further added, followed by thorough mixing under reduced pressure to obtain a composition.

Example 5

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of methyltributanoximesilane and 0.1 part by weight of dibutyltin dioctate were added, followed by thorough mixing under reduced pressure. Then, 2.0 parts by weight of the partial hydrolysis-condensation product 2, synthesized in Synthesis Example 2, was further added, followed by thorough mixing under reduced pressure to obtain a composition.

Example 6

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of vinyltriisopropenoxysilane, 0.5 part by weight of tetramethylguanidylpropyltrimethoxysilane and 0.1 part by weight of dibutyltin dioctate were added, followed by thorough mixing under reduced pressure. Then, 2.0 parts by weight of the partial hydrolysis-condensation product 2, synthesized in Synthesis Example 2, was further added, followed by thorough mixing under reduced pressure to obtain a composition.

Comparative Example 1

To 90 parts by weight of polydimethylsiloxane having a viscosity at 25° C. of 900 cSt and terminated with trimethoxylsilyl groups, 10 parts by weight of fumed silica surface-treated with dimethyldichlorosilane was added, and these were mixed by means of a mixer. Thereafter, 2 parts by weight of methyltrimethoxysilane and 0.1 part by weight of dibutyltin dioctate were added, followed by thorough mixing under reduced pressure. Then, 2.0 parts by weight of 3-(2-aminoethylamino)propyltrimethoxysilane was further added, followed by thorough mixing under reduced pressure to obtain a composition.

Comparative Example 2

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of methyltributanoximesilane and 0.1 part by weight of dibutyltin dioctate were added, followed by thorough mixing under reduced pressure. Then, 2.0 parts by weight of 3-(2-aminoethylamino) propyltrimethoxysilane was further added, followed by thorough mixing under reduced pressure to obtain a composition.

Comparative Example 3

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of vinyltriisopropenoxysilane, 0.5 part by weight of tetramethylguanidylpropyltrimethoxysilane and 0.1 part by weight of dibutyltin dioctate were added, followed by thorough mixing under reduced pressure. Then, 2.0 parts by weight of 3-(2-aminoethylamino)propyltrimethoxysilane was further added, followed by thorough mixing under reduced pressure to obtain a composition.

Comparative Example 4

To 90 parts by weight of polydimethylsiloxane having a viscosity at 25° C. of 900 cSt and terminated with trimethoxylsilyl groups, 10 parts by weight of fumed silica surface-treated with dimethyldichlorosilane was added, and these were mixed by means of a mixer. Thereafter, 2 parts by weight of methyltrimethoxysilane and 0.1 part by weight of dibutyltin dioctate were added, followed by thorough mixing under reduced pressure. Then, 2.0 parts by weight of 3-aminopropyltrimethoxysilane was further added, followed by thorough mixing under reduced pressure to obtain a composition.

Comparative Example 5

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of methyltributanoximesilane and 0.1 part by weight of dibutyltin dioctate were added, followed by thorough mixing under reduced pressure. Then, 2.0 parts by weight of 3-aminopropyltrimethoxysilane was further added, followed by thorough mixing under reduced pressure to obtain a composition.

Comparative Example 6

To 90 parts by weight of polydimethylsiloxane having a viscosity at 25° C. of 700 cSt and terminated with silanol groups, 10 parts by weight of fumed silica surface-treated with dimethyldichlorosilane was added, and these were mixed by means of a mixer. Thereafter, 6 parts by weight of vinyltriisopropenoxysilane, 0.5 part by weight of tetramethylguanidylpropyltrimethoxysilane and 0.1 part by weight of dibutyltin dioctate were added, followed by thorough mixing under reduced pressure. Then, 2.0 parts by weight of 3-aminopropyltrimethoxysilane was further added, followed by thorough mixing under reduced pressure to obtain a composition.

Compositional data of the respective compositions in the above Examples and Comparative Examples are summarized in Tables 1 and 2.

Initial Physical Properties

The compositions obtained were each shaped into a sheet of 2 mm in thickness, and the sheet was left for a week in an atmosphere of 23±2° C. and 50±5% RH to cure. Physical properties of the sheet were measured according to JIS K-6249.

Bond Strength

The compositions were each put between two strip-like adherends, which were arranged in line in the longitudinal direction with the respective one end parts being overlapped, at their overlapping parts having a bonding area of 20×30 mm and with a composition thickness of 5 mm, and then left for a week in an atmosphere of 23±2° C. and 50±5%RH to cure to bond them to prepare a test piece. Next, the unbonded end parts of the strip-like adherends, extending in the opposite direction of the bonded end portions, were pulled in the directions opposite to each other (the shear direction) to examine the bond strength visually. An instance in which the cured layer did not break and a good bond strength was confirmed was evaluated as "good", and an instance in which the cured layer was seen to have broken or somehow damaged was evaluated as "poor".

Storage Stability

Uncured compositions were each packaged in a cartridge and heated for a week to cure in a 70° C. dryer. Physical properties of the cured product obtained were measured in the same manner as the measurement of initial physical properties.

Results obtained are shown in Tables 1 and 2.

TABLE 1

| | | Example | | | | | |
|---|---|---|---|---|---|---|---|
| | | 1 | 2 | 3 | 4 | 5 | 6 |
| Compositional data: (part(s) by weight) | Silanol-terminated dimethylpolysiloxane 700 cSt | — | 90 | 90 | — | 90 | 90 |
| | Trimethoxylsilyl-terminated dimethylpolysiloxane 900 cSt | 90 | — | — | 90 | — | — |
| | Fumed silica | 10 | 10 | 10 | 10 | 10 | 10 |
| | Methyltrimethoxysilane | 2.0 | — | — | 2.0 | — | — |

TABLE 1-continued

|  |  | Example |  |  |  |  |  |
|---|---|---|---|---|---|---|---|
|  |  | 1 | 2 | 3 | 4 | 5 | 6 |
|  | Methylbutanoxime-silane | — | 6.0 | — | — | 6.0 | — |
|  | Vinyltriisopropenoxy-silane | — | — | 6.0 | — | — | 6.0 |
|  | Dibutyltin dioctate | 0.1 | 0.1 | 0.1 | 0.1 | 0.1 | 0.1 |
|  | Tetramethylguanidyl-propyltrimethoxy-silane | — | — | 0.5 | — | — | 0.5 |
|  | Partial hydrolysis-condensation product 1 | 2.0 | 2.0 | 2.0 | — | — | — |
|  | Partial hydrolysis-condensation product 2 | — | — | — | 2.0 | 2.0 | 2.0 |
|  | 3-(2-Aminoethylamino)propyltrimethoxy-silane | — | — | — | — | — | — |
|  | 3-Aminopropyl-trimethoxysilane | — | — | — | — | — | — |
| Initial physical proper-ties: | Hardness; Durometer A | 32 | 35 | 34 | 30 | 31 | 28 |
|  | Elongation at break (%) | 170 | 160 | 175 | 180 | 170 | 180 |
|  | Tensile strength (MPa) | 1.4 | 1.2 | 1.3 | 1.2 | 1.4 | 1.2 |
| Initial bond strength: | PBT* | good | good | good | good | good | good |
|  | PC* | good | good | good | good | good | good |
|  | PPS* | good | good | good | good | good | good |
| Physical proper-ties after storage: | Hardness; Durometer A | 37 | 30 | 32 | 34 | 35 | 34 |
|  | Elongation at break (%) | 160 | 180 | 175 | 140 | 120 | 160 |
|  | Tensile strength (MPa) | 1.5 | 1.2 | 1.5 | 1.6 | 1.5 | 1.4 |
| Bond strength after storage: | PBT* | good | good | good | good | good | good |
|  | PC* | good | good | good | good | good | good |
|  | PPS* | good | good | good | good | good | good |

*Remarks
PBT: Polybutylene terephthalate resin
PC: Polycarbonate resin
PPS: Polyphenylene sulfide resin

TABLE 2

|  |  | Comparative Example |  |  |  |  |  |
|---|---|---|---|---|---|---|---|
|  |  | 1 | 2 | 3 | 4 | 5 | 6 |
| Compositional data: (part(s) by weight) | Silanol-terminated dimethylpolysiloxane 700 cSt | — | 90 | 90 | — | 90 | 90 |
|  | Trimethoxylsilyl-term-inated dimethylpolysiloxane 900 cSt | 90 | — | — | 90 | — | — |
|  | Fumed silica | 10 | 10 | 10 | 10 | 10 | 10 |
|  | Methyltrimethoxy-silane | 2.0 | — | — | 2.0 | — | — |
|  | Methylbutanoxime-silane | — | 6.0 | — | — | 6.0 | — |
|  | Vinyltriisopropenoxy-silane | — | — | 6.0 | — | — | 6.0 |
|  | Dibutyltin dioctate | 0.1 | 0.1 | 0.1 | 0.1 | 0.1 | 0.1 |
|  | Tetramethylguanidyl propyltrimethoxy-silane | — | — | 0.5 | — | — | 0.5 |
|  | Partial hydrolysis-condensation product 1 | — | — | — | — | — | — |
|  | Partial hydrolysis-condensation product 2 | — | — | — | — | — | — |

TABLE 2-continued

| | | Comparative Example | | | | | |
|---|---|---|---|---|---|---|---|
| | | 1 | 2 | 3 | 4 | 5 | 6 |
| | 3-(2-Aminoethylamino)propyltrimethoxysilane | 2.0 | 2.0 | 2.0 | — | — | — |
| | 3-Aminopropyltrimethoxysilane | — | — | — | 2.0 | 2.0 | 2.0 |
| Initial physical properties: | Hardness; Durometer A | 32 | 35 | 34 | 30 | 31 | 28 |
| | Elongation at break (%) | 160 | 150 | 180 | 150 | 120 | 130 |
| | Tensile strength (MPa) | 1.4 | 1.5 | 1.3 | 1.2 | 1.5 | 1.4 |
| Initial bond strength: | PBT* | poor | poor | poor | poor | poor | poor |
| | PC* | poor | poor | poor | poor | poor | poor |
| | PPS* | poor | poor | poor | poor | poor | poor |
| Physical properties after storage: | Hardness; Durometer A | 32 | 35 | 31 | 31 | 30 | 32 |
| | Elongation at break (%) | 150 | 110 | 150 | 140 | 150 | 120 |
| | Tensile strength (MPa) | 1.5 | 1.7 | 1.4 | 1.3 | 1.2 | 1.5 |
| Bond strength after storage: | PBT* | poor | poor | poor | poor | poor | poor |
| | PC* | poor | poor | poor | poor | poor | poor |
| | PPS* | poor | poor | poor | poor | poor | poor |

As described above, the room temperature-curing organopolysiloxane composition of the present invention can provide a silicone rubber having superior adhesion to resins.

This silicone rubber is useful especially for sealing materials used at wet places, sealing materials for building construction and the bonding or fixing of electric or electronic component parts.

What is claimed is:

1. A room temperature-curing organopolysiloxane composition comprising:
   (A) 100 parts by weight of at least one member selected from the group consisting of an organopolysiloxane represented by the general formula (1):

$$HO(SiR^1_2O)_nH \quad (1)$$

wherein $R^1$'s are each independently a substituted or unsubstituted monovalent hydrocarbon group having 1 to 10 carbon atoms, and n is an integer of 10 or more;
   and an organopolysiloxane represented by the general formula (2):

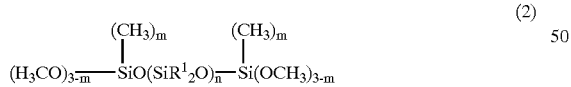
   (2)

wherein $R^1$'s and n are as defined above, and m's are each independently an integer of 0 or 1;
   (B) from 0.1 part by weight to 30 parts by weight of a silane compound having in its molecule an average of at least two silicon atom-bonded hydrolyzable groups and in which the silicon atom-bonded remaining group or groups, if present, is/are a group or groups selected from the group consisting of a methyl group, an ethyl group, a propyl group, a vinyl group and a phenyl group; a partial hydrolysis-condensation product thereof; or a mixture of these; and
   (C) from 0.1 part by weight to 10 parts by weight of a mixture of siloxanes having degrees of polymerization of from 2 to 10, which is a partial hydrolysis-condensation product of a silane compound having a group selected from the group consisting of an amino group, an epoxy group, a mercapto group, an acryloyl group and a methacryloyl group each bonded to the silicon atom through a carbon atom and having a hydrolyzable group bonded to the silicon atom, and said mixture (C) is a mixture of 50% or more of di- to tetramers in total and 20% or less of hexa- to decamers in total.

2. The composition according to claim 1, wherein the component (B) is selected from the group consisting of the ketoxime silanes, alkoxysilanes, acetoxysilanes, isopropenoxysilanes, and partial hydrolysis-condensation products of one of more of these silanes.

3. The composition according to claim 1, wherein the silane compound, the precursor of the component (C) siloxane mixture, is represented by the general formula (3) or (4).

$$H_2N(CH_2)_nSi(R^3)_c(OR^2)_{3-c} \quad (3)$$

$$H_2N(CH_2)_nHN(CH_2)_nSi(R^3)_c(OR^2)hd 3-c \quad (4)$$

wherein $R^2$ and $R^3$ are each an alkyl group having 1 to 4 carbon atoms, n is an integer of 1 to 10, and c is an integer of 0 to 2.

4. The composition according to claim 1, wherein the component-(C)siloxane mixture is a mixture of 70% or more of di- to tetramers in total and 10% or less of hexa- to decamers in total.

5. The composition according to claim 1, wherein the component (B) and the component (C) are present in an amount of 1 to 15 parts by weight and 2 to 6 parts by weight, respectively, per 100 parts by weight of the component (A).

* * * * *